(12) United States Patent
Thiel et al.

(10) Patent No.: US 7,164,569 B1
(45) Date of Patent: Jan. 16, 2007

(54) MECHANISM FOR AUTOMATED PERMANENT MAGNET DEGAUSSING

(75) Inventors: LeRoy D. Thiel, Lincoln, NE (US); Robert A. Schultz, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 199 days.

(21) Appl. No.: 10/881,634

(22) Filed: Jun. 30, 2004

(51) Int. Cl.
*H01F 13/00* (2006.01)
*H01H 47/00* (2006.01)

(52) U.S. Cl. ........................ 361/149; 361/143; 361/150; 361/151; 361/267

(58) Field of Classification Search ................ 361/147, 361/149–151, 267, 143
See application file for complete search history.

(56) References Cited

U.S. PATENT DOCUMENTS

| | | | |
|---|---|---|---|
| 2,481,392 A | 9/1949 | Camras | |
| 2,766,328 A | 10/1956 | Handschin et al. | |
| 2,962,560 A | 11/1960 | Folse | |
| 3,023,280 A | 2/1962 | Tronslin et al. | |
| 3,078,396 A | 2/1963 | Englested | |
| 3,143,689 A | 8/1964 | Hall | |
| 3,329,872 A | 7/1967 | Amos | |
| 3,588,623 A | 6/1971 | Camras | |
| 3,872,347 A | 3/1975 | Matsushima et al. | |
| 3,879,663 A | 4/1975 | Stark, Jr. | |
| 3,879,754 A | 4/1975 | Ballinger | |
| 3,895,270 A | 7/1975 | Maddox | |
| 3,938,011 A | 2/1976 | Littwin | |
| 4,136,373 A | 1/1979 | Amos | |
| 4,146,956 A | 4/1979 | Fujiwara | |
| 4,157,581 A * | 6/1979 | Keiichi et al. | ............... 361/267 |
| 4,180,835 A | 12/1979 | Okumura et al. | |
| 4,187,521 A | 2/1980 | Rotter et al. | |
| 4,346,426 A | 8/1982 | Baumann et al. | |
| 4,378,581 A | 3/1983 | Kuno et al. | |
| 4,423,460 A | 12/1983 | Jackson et al. | |
| 4,847,727 A | 7/1989 | Spaman | |
| 5,132,860 A | 7/1992 | Von Stein | |
| 5,416,664 A * | 5/1995 | Becker et al. | ............... 361/149 |
| 5,787,619 A | 8/1998 | Urushibata | |
| 6,570,727 B1 | 5/2003 | Tamura et al. | |
| 6,594,099 B1 | 7/2003 | Serizawa | |
| 6,731,491 B1 | 5/2004 | Schultz | |
| 7,027,249 B1 | 4/2006 | Hasegawa et al. | |
| 2002/0021521 A1 | 2/2002 | Kitahori et al. | |
| 2003/0021652 A1 | 1/2003 | Uno et al. | |
| 2004/0051989 A1 | 3/2004 | Hasegawa et al. | |

\* cited by examiner

*Primary Examiner*—Stephen W. Jackson
*Assistant Examiner*—Dharti H. Patel
(74) *Attorney, Agent, or Firm*—Fitch, Even, Tabin & Flannery

(57) ABSTRACT

A bulk degaussing system for the erasure of magnetic storage media by means of permanent magnets. The bulk degaussing system includes a rotatably mounted carousel and an angular displacement means that angularly displaces the carousel through a predetermined angle after passage of the carousel through a degaussing gap.

18 Claims, 5 Drawing Sheets

MECHANISM FOR AUTOMATED PERMANENT MAGNET DEGAUSSING

FIELD OF THE INVENTION

The present invention relates to a bulk degaussing system for the erasure of magnetic storage media, said system having a means for generating a magnetic degaussing field of effective strength, means for translating magnetic storage media through the degaussing field, angular displacement means for rotating storage media after passage through the degaussing field, and means for returning rotated storage media through the same degaussing field.

BACKGROUND

It is understood in the art that the complete uniform rotation of magnetic storage media within a magnetic field, including electronic or mechanical means to reverse field polarity, alter field orientation or gradually reduce magnetic strength, is generally an ideal means for erasing magnetically encoded information and promoting media reuse. However, it is also understood that the complete exposure of magnetic storage media to magnetic fields oriented approximately 90 degrees apart is an effective means for achieving quality erasure. Because there are a variety of magnetic storage media formats and media erasure standards, and because many degaussing applications tend more towards erasure and disposal, where media is erased to prevent unauthorized access to information when media is discarded (e.g., disposal of obsolete equipment, media erasure during a security emergency, etc.), than towards erasure and reuse, there are numerous bulk degaussing systems available that balance application requirements, size, cost, performance and the degree of operator skill required for proper use.

Bulk degaussing systems include handheld, tabletop, drop-through, conveyor-based, and cavity degaussing devices. Handheld, tabletop and simple conveyor-based devices typically require a human operator to manually rotate and possibly flip magnetic storage media between multiple passes through a magnetic field to achieve complete exposure and quality erasure. These devices are not well suited for high security applications since their performance will vary depending upon the diligence and skill of the human operator. Alternately, there are more complex drop-through and conveyor-based devices that employ arrays of magnetic poles generating multiple magnetic fields and permit quality erasure in a single pass. These devices do not require manual manipulation of magnetic media, but instead require substantially longer or more numerous magnetic field generating elements and longer degaussing paths. For example, a known conveyor-based device employs two pairs of opposed magnetic poles oriented at 90 degrees with respect to each other and at 45 degrees with respect to a degaussing path (FIG. 1). This configuration exposes magnetic storage media to two magnetic fields oriented approximately 90 degrees apart, but requires magnet pole and degaussing path lengths that are approximately three times longer than the intermediate dimension of the largest format media to be erased with the device. The longer pole and path lengths significantly increase the size and cost of such devices, and the increased cost can be especially significant if high strength rare earth permanent magnets are used in place of high power electromagnets. Cavity degaussing devices typically employ such high power electromagnets, which permit electronic manipulation of the orientation and strength of the magnetic degaussing field(s), but also require a reliable source of household or industrial current and some form of passive or active cooling during degaussing operation.

There is a need for improved bulk degaussing systems that have reduced size and cost, that reduce or eliminate electrical service requirements, that expose magnetic storage media to magnetic fields having varying orientations, and that reduce or minimize the degree of operator skill required to achieve quality erasure. U.S. Pat. Nos. 4,157,581 and 5,132,860 disclose bulk degaussing systems that rotate permanent magnets with respect to magnetic storage media while such media are translated through a magnetic field. Because magnetic domain switching can occur in a microsecond, a device may employ a rotating magnetic field to expose magnetic media to a variety of magnetic field orientations, thereby reducing the number of magnetic field generating elements required to produce quality erasure. However, such rotating magnetic fields can induce a sympathetic rotation in some magnetic storage media formats, which should be prevented to ensure quality erasure. For example, the '581 patent discloses a degaussing apparatus that employs projections that lock the hubs of magnetic tape cassettes to prevent rotation of tape or tape reels during an erasing operation. Such hub locking means tend to be format specific, which reduces the usefulness of the device or requires the manufacture and purchase of a variety of format specific media holders. Furthermore, such hub locking means cannot be used when a hub is inaccessible, as, for example, in most hard disk drives, where an internal spindle does not mechanically communicate with any external feature. Interactions between the rotating magnetic field and the spindle rotor in a hard disk drive can lock the platters in a single orientation with respect to a rotating magnetic field, which will prevent the recording surfaces from experiencing exposure to varying magnetic direction, and prevent quality erasure of the device.

SUMMARY OF THE INVENTION

The present invention provides a bulk degaussing system for the erasure of magnetic storage media by means of permanent magnets. The bulk degaussing system includes a rotatably mounted carousel and an angular displacement means that angularly displaces the carousel through a predetermined angle after passage of the carousel through a degaussing gap.

BRIEF DESCRIPTION OF THE DRAWINGS

The present invention will be readily understood with reference to the detailed description and attached drawings, wherein.

DETAILED DESCRIPTION OF THE PREFERRED EMBODIMENTS

Figure 1:
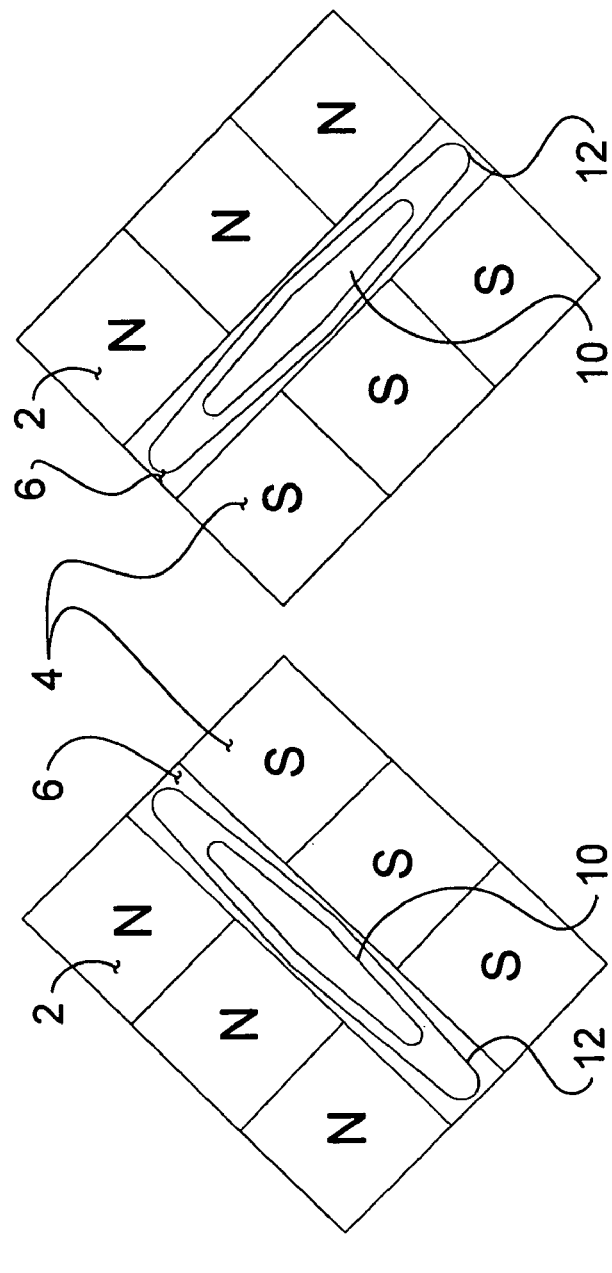
FIG. 1 is a simplified plan view of a prior art conveyor-based device employing two pairs of magnetic circuit assemblies oriented at 90 degrees with respect to each other and at 45 degrees with respect to a degaussing path. Analogous features of the magnetic circuits are identified by the appropriate reference numerals for the convenience of the reader.
Figure 1:
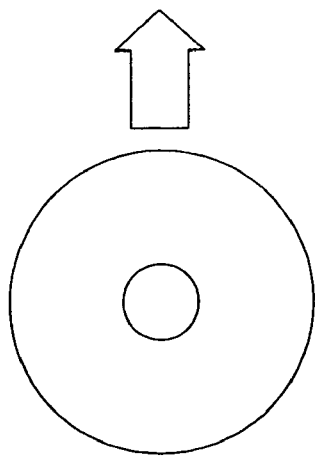
Figure 2:
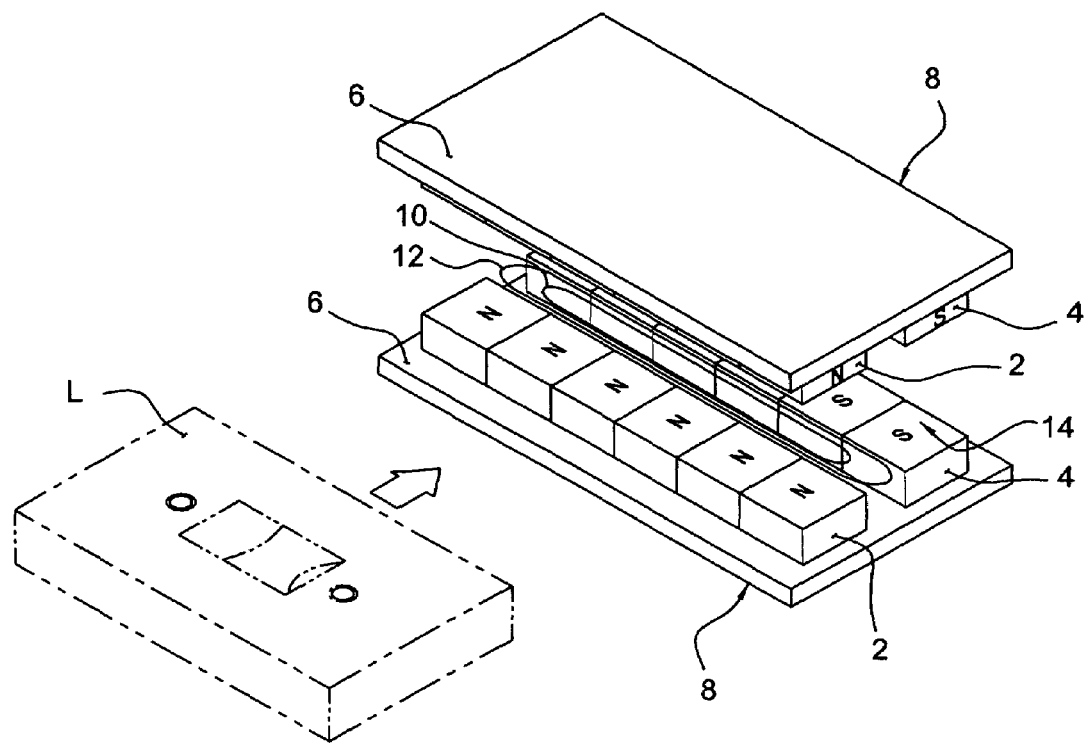
FIG. 2 is an isometric view of a pair of magnetic circuit assemblies. A magnetic tape cassette "L" is shown as an example of a magnetic storage medium.

Referring initially to FIG. 2, the bulk degaussing system provides a means for generating a magnetic degaussing field. This means comprises an elongated North pole 2 and South pole 4, each constructed from one or more permanent magnet elements, affixed to adjacent portions of a magnetic circuit base 6 and separated by a void or a non-magnetic spacer, such that the combination forms a magnetic circuit assembly 8 that projects magnetic flux toward a degaussing gap 14. The permanent magnet elements may be AlNiCo (aluminum-nickel-cobalt) magnets, NdFeB (neodymium-iron-boron) magnets, or any other type of magnet capable of generating a strong magnetic field. The magnetic circuit base 6 is constructed from a material having a high magnetic permeability and saturation, such as iron or low carbon steel, to provide a suitable flux return path and to minimize fringing and leakage flux.

A pair of magnetic circuit assemblies 8 configured such that like poles face each other across degaussing gap 14 generate the magnetic degaussing field. It is well known that this configuration concentrates magnetic fields and produces a pattern of magnetic flux that is principally directed between adjacent poles, parallel to a horizontal plane of mirror image symmetry dividing degaussing gap 14. This plane of symmetry represents the worst case for magnetic field strength and direction since field strength tends to vary in inverse proportion to the square of the distance from a pole and magnetic flux will not cross the plane. The magnetic field strength will fall to a minimum in portions of the plane adjacent to the ends of the circuit assemblies since, as a rule of thumb, field strength will also drop by about 50% towards the ends of the poles—"100%" contour 10 and "50%" contour 12 are shown in FIG. 2 for illustrative purposes. However, the distance separating adjacent portions of North pole 2 and South pole 4 in each circuit assembly can be optimized to vary the magnetic reluctance of the circuit and alter the magnetic degaussing field, such that field strength remains strong and practically constant along an extended central portion of each magnetic circuit assembly 8. This central portion of a magnetic circuit assembly, whether extended or not, is described hereafter as the "working length" of the assembly.

In preferred embodiments, North pole 2 and South pole 4 are constructed from adjoining 2" by 2" by 1" (L×W×D) NdFeB blocks, a common magnet product that is capable of generating a very strong magnetic field. The blocks are well suited for use in the invention because they can be assembled to construct degaussing devices having various pole lengths, and individually positioned to alter the magnetic degaussing field, eliminating the need for expensive custom permanent magnet elements. For example, a device designed to degauss DLT form factor (about 4.2" by 4.2" by 1.0") and LTO form factor (about 4.0" by 4.2" by 0.8") tape cassettes can be constructed from twelve such blocks arranged to form four 6" long poles. Another device designed to degauss 3½" hard disk drives (about 5.8" by 4.0" by 1.0") and other smaller media can be constructed from sixteen such blocks arranged to form four 8" long poles. The embodiment shown FIG. 2 is designed to degauss DTF "L" form factor tape cassettes (about 5.7" by 10.0" by 1.0") and other smaller media, and constructed from twenty four such blocks arranged to form four 12" long poles.

The long dimension of the largest media form factor to be erased in a device will dictate the lengths of the poles required in a particular design. Each North pole 2 and South pole 4 should be longer than that long dimension to provide an appropriate working length, and to ensure that every portion of a magnetic storage medium is exposed to a strong magnetic field. In most preferred embodiments, the width of the void or non-magnetic spacer separating adjacent blocks forming North pole 2 and South pole 4 in a magnetic circuit assembly 8 is varied from about 0.15" at the edges of the assembly to about 0.35" at the center of the assembly to reduce the magnetic reluctance at the ends of the circuit and minimize the lengths of the poles. This optimization produces a magnetic field that remains practically constant to within about 1" of the ends of the poles. The optimized form of the embodiment shown in FIG. 2 provides a DTF-sized working length with a magnetic field strength non-uniformity of about 15%. Smaller media form factors translated through the center of a DTF-sized working length will be exposed to an even more uniform field having a field strength non-uniformity approaching 1%.

Figure 3:
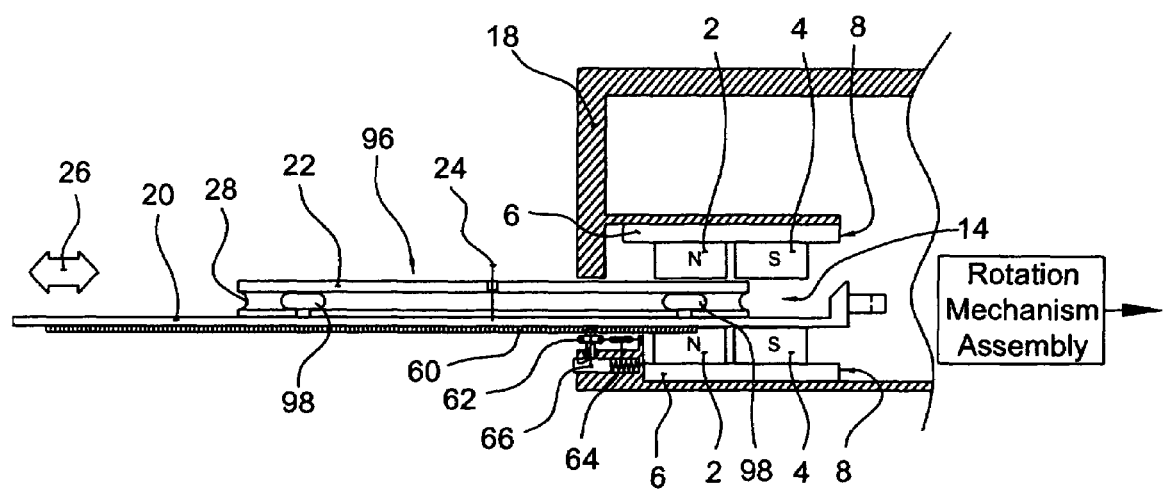
FIG. 3 is a partial side view of an embodiment including a pair of magnetic circuit assemblies, a media drawer, a media transport carousel, and an anti-reverse mechanism.

Referring now to FIG. 3, the magnetic circuit assemblies 8 are affixed to opposing portions of a housing 18 across a degaussing path. In the illustration, the upper magnetic circuit assembly is affixed to a projection in housing 18 to minimize the width of degaussing gap 14 and to maximize the worst case magnetic field strength. However, there are various means for securing each magnetic circuit assembly 8 in the desired configuration. Most notably, one or both magnetic circuit assemblies could be affixed to an adjustable frame having a mechanism permitting an operator to adjust the width of degaussing gap 14, so that media form factors deeper than the approximately 1" deep form factors described herein can be erased in the same device. Embodiments permitting wider degaussing gaps may require additional or stronger magnet elements depending on the strength of the magnet elements, the coercivity of the magnetic storage media to be degaussed, the depth of the media form factor, and the required width of degaussing gap 14, among other factors.

The bulk degaussing system further provides a means for translating magnetic storage media through the magnetic degaussing field. This means generally comprises a media drawer 20 and a media transport carousel 22. Media drawer 20 is mounted to housing 18, or to a supporting framework contained within such a housing, and constrained to slide between and through the pair of magnetic circuit assemblies 8 by linear bearings or slides 94 (shown in FIG. 4) which provide a low friction action along line of travel 26. Media transport carousel 22 may be rotatably mounted on media drawer 20 through its center axis 24 by a pin, or along its periphery by a race and bearings or similar means. In preferred embodiments, media transport carousel 22 is mounted on media drawer 20 and constrained to rotate about its center axis 24 by a plurality of rollers 98 affixed to media drawer 20 that engage a groove 28 extending around the peripheral edge of the carousel. This provides a simple but thin mechanism that does not require a substantial increase in the width of degaussing gap 14. Media transport carousel 22 provides a cavity 96 (shown in FIG. 4) for receiving magnetic storage media. Cavity 96 is preferably square or rectangular, and sized to accept the largest media form factor to be erased in the device. In preferred embodiments, cavity 96 constrains magnetic storage media to ensure that it is translated through the degaussing field with a well defined orientation. Various means may be used to constrain storage media within cavity 96: the cavity may be sized to constrain a particular media form factor; removable blocks may be placed in the cavity to form smaller cavities sized to constrain smaller media form factors; or media transport carousel 22 may include manually adjustable and/or spring loaded cavity wall portions, such that the cavity can be dynamically configured by an operator to constrain a range of media form factors. These structures may act in concert with a carousel lock mechanism to prevent storage media from shifting or rotating due to inertia or interactions between a storage medium and the magnetic degaussing field.

An operator starts the degaussing process by opening media drawer 20 and placing a magnetic storage medium into cavity 96 in media transport carousel 22. The operator then closes media drawer 20, translating media transport carousel 22 and the storage medium carried therein between the pair of magnetic circuit assemblies 8 and through the magnetic degaussing field, completely exposing the storage medium to a degaussing field having a first orientation relative to the storage medium. In preferred embodiments, media drawer 20 is driven manually by the action of the operator. In alternate embodiments, media drawer 20 could be electromechanically driven by an electric motor controlled by one or more contact switches or similar position sensing means; however, such alternate embodiments would be dependant on a source of electrical power and thereby potentially inoperable in emergency situations where electrical power might fail or be cut off.

Most preferred embodiments include an anti-reverse mechanism to ensure that human operators fully and properly close and open media drawer 20. This anti-reverse mechanism comprises a ratchet 60 affixed to the lower side of media drawer 20, and a pawl 62 and bias spring 64 affixed to housing 18 adjacent to ratchet 60. As an operator closes media drawer 20, ratchet 60 engages pawl 62 and rotates it about its axis to create a forward biased travel, preventing incomplete closure of media drawer 20. As media drawer 20 reaches a fully closed position, ratchet 60 ends and bias spring 64 returns pawl 62 to a neutral position. As an operator reopens media drawer 20, ratchet 60 again engages pawl 62 and rotates it in the opposite direction about its axis to create a backward biased travel, preventing the reclosure of media drawer 20 before it reaches a fully open position. As media drawer 20 reaches a fully open position, ratchet 60 ends and bias spring 64 again returns pawl 62 to a neutral position, resetting the mechanism. A notched release plunger 66 may support pawl 62 and permit an operator to manually disengage the pawl from ratchet 60 if a jam occurs. The anti-reverse mechanism acts to ensure that magnetic storage media carried in cavity 96 are fully translated through the magnetic degaussing field, and that subsequent mechanisms are fully engaged and reset during the operation of the device.

Figure 4:
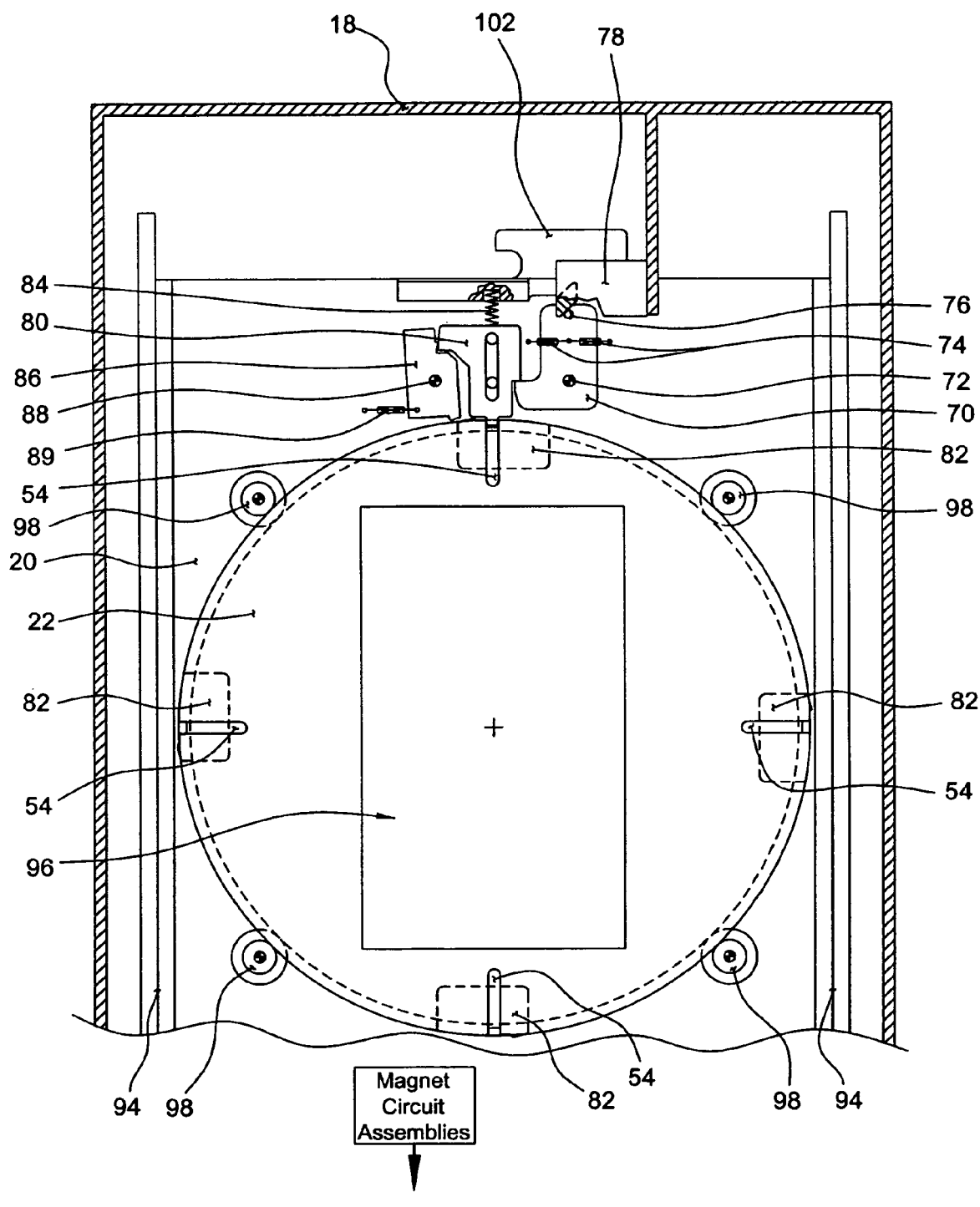
FIG. 4 is a plan view of the embodiment depicted in FIG. 3, further illustrating the action of the sliding media drawer and media transport carousel in relation to a carousel locking mechanism and a carousel lock release mechanism.

Referring now to FIG. 4, preferred embodiments provide a carousel locking mechanism to ensure that interactions between magnetic storage media and the magnetic degaussing field do not cause media transport carousel 22 to rotate as a storage medium is translated through the degaussing field. The media transport carousel locking mechanism comprises a lock arm 80 slidably affixed to media drawer 20 adjacent to media transport carousel 22 and a spring 84 biasing lock arm 80 towards a plurality of notches or carousel inserts 82 disposed about the periphery of media transport carousel 22. Lock arm 80 engages a notch or carousel insert 82 to prevent the rotation of media transport carousel 22 during a substantial portion of the closing and opening travel of media drawer 20. A carousel lock release mechanism disengages lock arm 80 from notch or carousel insert 82 to permit the rotation of media transport carousel 22 during a remaining portion of the closing and opening travel of media drawer 20 described hereafter. In alternate embodiments, and under limited circumstances, friction between media transport carousel 22 and media drawer 20 could prevent rotation of the carousel, but interactions between a storage medium and the degaussing field may vary greatly depending on the position of the storage medium in cavity 96 and the size, construction and coercivity of the media. The media transport carousel locking mechanism acts to prevent the inconsistent and undesirable rotation of media transport carousel 22 that could occur in a friction-dependant design. The media transport carousel locking mechanism also provides a means for repeatedly and correctly aligning mechanisms that rotate media transport carousel 22 during the remaining portion of the closing and opening travel of media drawer 20 described hereafter. In other alternate embodiments employing an electric motor as part of an angular displacement means for rotating storage media, the media transport carousel locking mechanism may be supplemented by or replaced by a resisting force supplied by the electric motor.

The bulk degaussing system further provides an angular displacement means for rotating magnetic storage media after passage through the magnetic degaussing field. In preferred embodiments, the displacement means generally comprises a set of mechanical linkages driven by the action of an operator closing and opening media drawer 20, and a linkage-driven rotating arm mechanism that engages media transport carousel 22; the linkages contacting media drawer 20 during a remaining portion of the closing and opening travel of the drawer, after media transport carousel 22 and the magnetic storage medium carried therein have been initially translated through the magnetic degaussing field, and before media transport carousel 22 and the magnetic storage medium carried therein are returned through the same magnetic degaussing field. In alternate embodiments, the aforementioned media transport carousel locking mechanism could be disengaged by an electric motor or solenoid controlled by a contact switch or other position sensing means. In those or other alternate embodiments, media transport carousel 22 could be electromechanically rotated by an electric motor driving an axle connected to the center axis 24 of media transport carousel 22, or to a gear or roller 98 engaging the periphery of media transport carousel 22, that is similarly controlled by one or more contact switches or other position sensing means. Such alternate embodiments would again be dependant on a source of electrical power and thereby potentially inoperable in emergency situations where electrical power might fail or be cut off.

In preferred embodiments, the set of mechanical linkages includes a carousel lock release mechanism, generally comprising a bi-directional lock release cam 78 affixed to housing 18, a release arm 70 and cam follower 76 pivotably mounted to media drawer 20 through pivot point 72, adjacent to lock arm 80, and a reset arm 86 pivotably mounted to media drawer 20 through pivot point 88, adjacent to lock arm 80 and opposite release arm 70. Release arm 70 engages lock arm 80, and springs 74 bias the mechanisms, including cam follower 76, towards a neutral position such that lock arm 80 typically engages and locks media transport carousel 22 through a carousel insert 82. Spring 89 biases reset arm 86 towards engagement with a projection extending from lock arm 80 such that, after a predetermined unlocking travel of lock arm 80, reset arm 86 will rotate into engagement with and hold lock arm 80 in a released state. After media transport carousel 22 and the magnetic storage medium carried therein have been initially translated through the magnetic degaussing field, the continued closing travel of media drawer 20 causes cam follower 76 to contact lock release cam 78 and rotate release arm 70, driving lock arm 80 toward a released state and disengaging the arm from carousel insert 82. After a predetermined unlocking travel of lock arm 80, reset arm 86 rotates, engages and holds lock arm 80 in that released state. The rotation of reset arm 86 also positions a trigger projection extending from reset arm 86 in close proximity to media transport carousel 22. Cam follower 76 subsequently loses contact with lock release cam 78, and springs 74 return release arm 70 to a neutral position. After the operator fully closes and begins to reopen media drawer 20, the opening travel of media drawer 20 causes cam follower 76 to recontact lock release cam 78 and rotate release arm 70 in the opposite direction, such that release arm 70 rotates away from engagement with lock arm 80. Cam follower 76 again loses contact with lock release cam 78 and springs 74 again return release arm 70 to a neutral position. As media transport carousel 22 is rotated by other mechanisms described herein, another carousel insert 82 engages the trigger projection extending from reset arm 86, rotating reset arm 86 in the opposite direction, thereby releasing lock arm 80 from its released state and resetting the mechanism. Spring 84 drives lock arm 80 back into engagement with carousel insert 82 to prevent the rotation of media transport carousel 22 as the carousel and the magnetic storage medium carried therein are translated back through the degaussing field.

Figure 5:
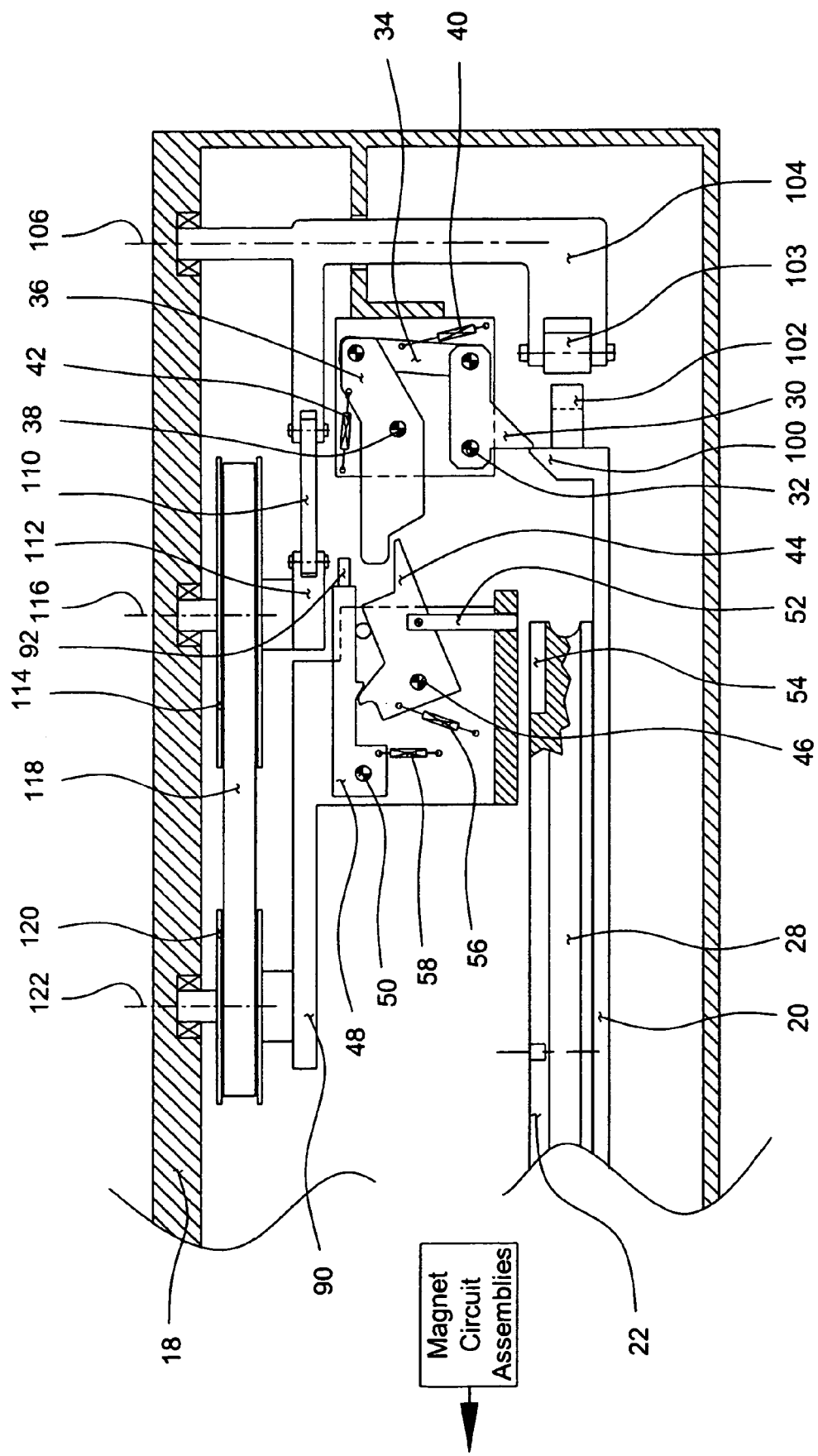
FIG. 5 is a partial side view of the embodiment depicted in FIGS. 3–4, illustrating the action of the sliding media drawer and media transport carousel in relation to certain components of an angular displacement means for rotating the media transport carousel.

Referring now to FIG. 5, the set of mechanical linkages includes a first four bar linkage affixed to a projection extending from housing 18, generally comprising an input link 30 rotating about pivot point 32, a connecting link 34, and an output link 36 rotating about pivot point 38. Springs 40 and 42 bias the linkage in a neutral position. After media transport carousel 22 and the magnetic storage medium carried therein have been initially translated through the magnetic degaussing field, the continued closing travel of media drawer 20 causes a bumper 100 to contact and rotate input link 30, thereby operating connecting link 34 and output link 36. Output link 36 rotates and contacts a portion of the rotating arm mechanism, causing it to engage one of a plurality of slots 54 in media transport carousel 22. Further closing travel of media drawer 20 causes input link 30 to lose contact with bumper 100, and springs 40 and 42 return the linkage to a neutral position. After the operator fully closes and begins to reopen media drawer 20, the opening travel of media drawer 20 causes bumper 100 to recontact input link 30, operating connecting link 34 and output link 36. Output link 36 rotates in the opposite direction, such that the link rotates away from contact with the rotating arm mechanism. Further opening travel of media drawer 20 again causes input link 30 to lose contact with bumper 100, and springs 40 and 42 return the linkage to a neutral position, resetting the mechanism.

The set of mechanical linkages also includes a second four bar linkage transferring power provided by an operator during the closing and opening of media drawer 20 to a rotating arm mechanism that engages media transport carousel 22, such that the linear motion of media drawer 20 is communicated to and transformed into an angular displacement of media transport carousel 22, rotating the storage media carried therein. The second four bar linkage generally comprises an actuator arm 104 pivotably mounted to housing 18 with an axis of rotation 106, a connecting link 110, and a drive link 112 rigidly connected to a drive pulley 114, which is rotatably affixed to housing 18 through its center axis 116. A spring 108 (shown in FIG. 6) supplies an over center force to actuator arm 104, such that the spring supplies a force biasing actuator arm 104 toward the extremes of its rotational travel. A rest or hook 102, affixed to media drawer 20 and/or bumper 100, constrains actuator arm 104 as it enters and leaves an engaged extreme of its rotational travel to permit the opening travel of media drawer 20 to reset the mechanism. Rest or hook 102 also acts in concert with spring 108 to supply a restraining force that maintains media drawer 20 in a closed position when the bulk degaussing system is not in use. Actuator arm 104 may provide a roller 103 to improve the interaction between media drawer 20, bumper 100, rest or hook 102 and actuator arm 104. After media transport carousel 22 and the magnetic storage medium carried therein have been initially translated through the magnetic degaussing field, the continued closing travel of media drawer 20 causes the drawer, and/or bumper 100, to contact and rotate actuator arm 104 towards rest or hook 102 and the engaged extreme of its rotational travel, thereby operating connecting link 110, drive link 112 and drive pulley 114. Drive pulley 114 transfers its rotational motion to a driven pulley 120 through a drive belt or chain 118 that provides a no slip connection to the rotating arm mechanism. After the operator fully closes and begins to reopen media drawer 20, the opening travel of media drawer 20 and rest or hook 102 drives actuator arm 104 back along media drawer 20, and/or bumper 100, such that, after a predetermined return rotation of actuator arm 104, spring 108 supplies a force biasing actuator arm 104 towards a disengaged extreme of its rotational travel. Media drawer 20 and spring 108 act in concert to return actuator arm 104 to the disengaged extreme of its rotational travel, reversing the operation of connecting link 110, drive link 112, drive pulley 114, and drive belt or chain 118, and resetting the mechanism.

The rotating arm mechanism generally comprises driven pulley 120, which is rotatably affixed to housing 18 through its center axis 122, a rotating arm 90 rigidly connected thereto, an index pin holder 44 pivotably mounted to rotating arm 90 through pivot point 46, an index pin lock arm 48 pivotably mounted to rotating arm 90 through pivot point 50, and an index pin 52 carried by index pin holder 44. Spring 56 biases index pin holder 44 towards contract with output link 36 of the first four bar linkage, and index pin 52 away from engagement with media transport carousel 22. Spring 58 biases index pin lock arm 48 towards engagement with a projection extending from index pin holder 44 such that, after a predetermined rotating travel of index pin holder 44, index pin lock arm 48 will rotate into engagement with index pin holder 44 and lock index pin 52 in an engaged state. Rotating arm 90 constrains index pin 52 to travel along a generally linear path towards and away from engagement with media transport carousel 22. After media transport carousel 22 and the magnetic storage medium carried therein have been initially translated through the magnetic degaussing field, the continued closing travel of media drawer 20 causes bumper 100 to contact the first four bar linkage, thereby causing output link 36 to contact and rotate index pin holder 44, driving index pin 52 into engagement with one of a plurality of slots 54 in media transport carousel 22. After a predetermined rotating travel of index pin holder 44, index pin lock arm 48 rotates and engages index pin holder 44, locking index pin 52 in that engaged state.

In preferred embodiments, the continued closing travel of media drawer 20 also causes the carousel lock release mechanism to disengage lock arm 80 from carousel insert 82, but only after index pin 52 engages slot 54, such that media transport carousel 22 can only rotate under the influence of rotation arm 90. However, since the magnetic storage medium placed in cavity 96 has been translated beyond the magnetic degaussing field, typically there will be no rotational force acting on media transport carousel 22, so that lock arm 80 could be disengaged concurrently with or even prior to the engaging travel of index pin 52, such that interlocking engagement and disengagement is preferred but not required.

Figure 6:
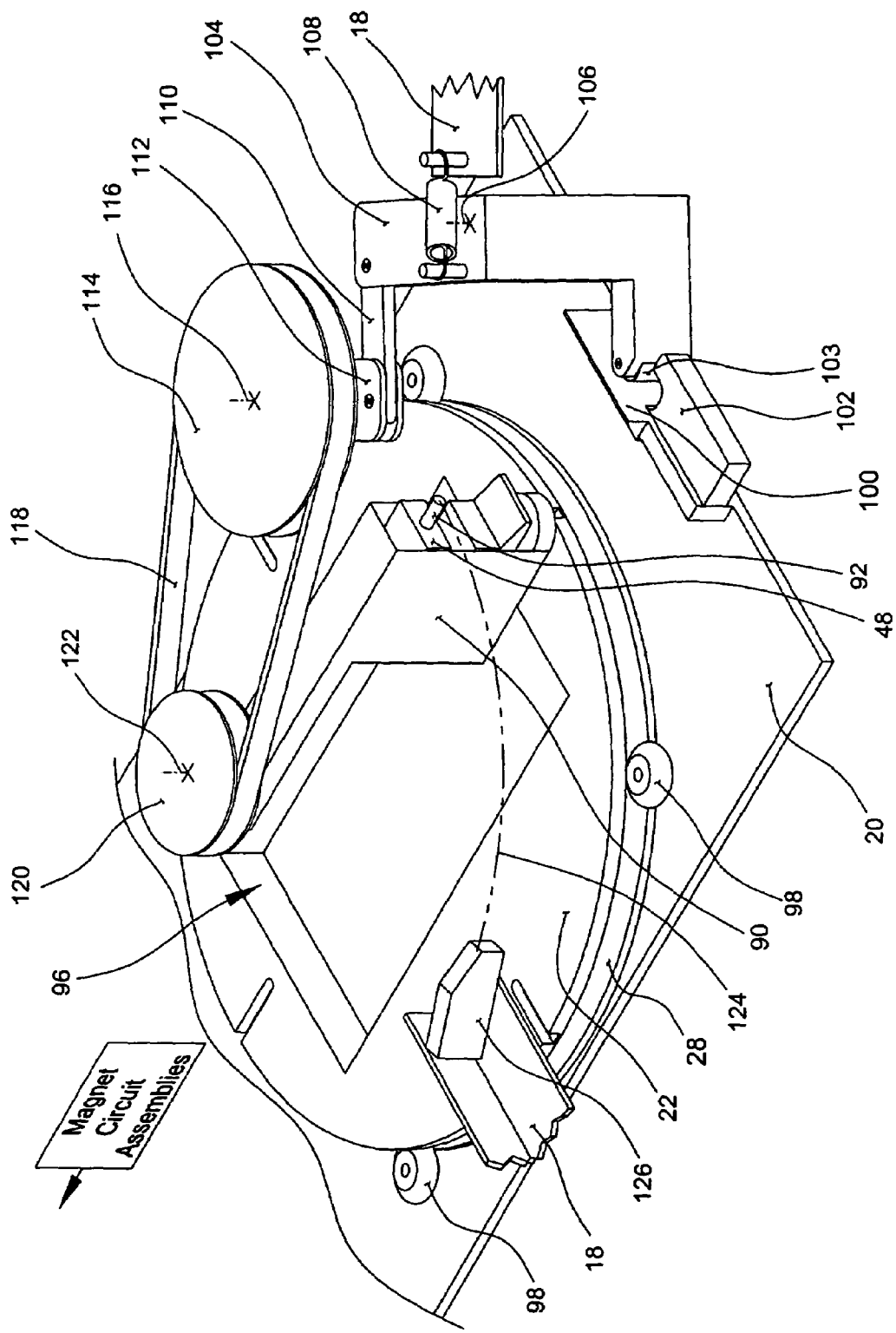
FIG. 6 is a scaled isometric view of the embodiment depicted in FIGS. 3–5, further illustrating the action of the sliding media drawer and media transport carousel in relation to the angular displacement means.

Referring now to FIG. 6, after rotation arm 90 has engaged media transport carousel 22, media drawer 20, and/or bumper 100, contacts the second four bar linkage, thereby causing drive belt or chain 118 to transfer a rotational motion to driven pulley 120 and rotation arm 90. Rotation arm 90 produces an angular displacement of media transport carousel 22, and carries a release pin 92 that projects from index pin lock arm 48 toward a release pin cam 126 affixed to housing 18. Release pin 92 travels along path 124, contacts release pin cam 126, and rotates index pin lock arm 48 away from engagement with index pin holder 44, breaking contact with media transport carousel 22 and releasing index pin 52 from its engaged state. Media drawer 20 may simultaneously or subsequently complete its closing travel. As an operator reopens media drawer 20, the drawer and/or bumper 100, the rest or hook 102, and spring 108 reverse the operation of the second four bar linkage, thereby transferring an opposite rotational motion to driven pulley 120 and rotation arm 90, which returns the rotation arm 90 to its original position and resets the mechanism.

While index pin 52 is in its engaged state, the rotation of rotation arm 90 through a predetermined angle and the closing travel of media drawer 20 over a predetermined distance act in concert to produce a precise angular displacement in media transport carousel 22. Depending on the dimensions and placement of the first and second four bar linkages, the rotating arm mechanism, and release pin cam 126, the bulk degaussing system may rotate media transport carousel 22 through a predetermined angle ranging from about 10 degrees to about 350 degrees. In the embodiment shown in the scaled isometric view of FIG. 6, media transport carousel 22 has a radius of 7.1", index pin 52 engages with a slot 54 in media transport carousel 22 at a radius varying from 6.5" to 7.0" from its center axis 24, rotation arm 90 rotates through a predetermined angle of 76 degrees, and media drawer 20 closes over a predetermined distance of 1.5 inches, thereby rotating media transport carousel 22 through a preferred angle of 90 degrees. Slots 54 and notches or carousel inserts 82 are disposed about the periphery of media transport carousel 22 at appropriate locations based on the angular displacement produced in a particular design.

The bulk degaussing system further provides a means for returning rotated storage media through the same degaussing field. An operator reopens media drawer 20 to retrieve the magnetic storage medium from cavity 96 in media transport carousel 22, translating the carousel and the rotated storage medium carried therein back between and through the pair of magnetic circuit assemblies 8, and completely exposing the rotated storage medium to a degaussing field having a second orientation relative to the medium. Preferred embodiments produce an angular displacement of media transport carousel 22 of about 90 degrees, so that magnetic storage media are exposed a magnetic degaussing field having two different orientations, about 90 degrees apart, relative to the storage medium, which is sufficient to produce a quality erasure. However, in some circumstances, it may be desirable to produce alternate angular displacements, such as 45 degrees, and to require an operator to repeat the steps of closing and reopening media drawer 20 one or more times, so that magnetic storage media are exposed to a degaussing field having several different orientations relative to the storage medium, and erasure performance approaches that which might be obtained by complete and uniform rotation of the media within a magnetic field. Those of skill in the art will recognize that adjustments to the placement and dimensions of the mechanisms described herein can produce a well defined angular displacement of media transport carousel 22 that is greater than, equal to or less than the preferred angle of 90 degrees, and that such adjustments will produce quality erasure so long as an operator closes and reopens media drawer 20 a sufficient number of times to produce at least two exposures to a magnetic degaussing field where the orientations of the field relative to storage medium differ by approximately 90 degrees.

What is claimed is:

1. A magnetic bulk degaussing system for erasing magnetic storage media, comprising:
   magnetic field means for generating a magnetic field across a degaussing gap;
   a drawer, for carrying the a magnetic storage medium;
   drawer mounting means for mounting said drawer for movement through said degaussing gap;
   a carousel carried by said drawer, for holding said magnetic storage medium;
   carousel mounting means for rotatably mounting said carousel on said drawer;
   locking means for selectably locking said carousel against rotation as said carousel passes through said degaussing gap; and
   angular displacement means cooperating with said rotatable mounting means and said locking means for angularly displacing said carousel through predetermined angle with respect to said drawer after passage of said carousel through said degaussing gap.

2. The system of claim 1 wherein said drawer mounting means comprises means for mounting said drawer for reciprocating linear movement through said degaussing gap.

3. The system of claim 1 wherein said system further comprises a supporting framework and said drawer mounting means comprises linear slides joining said drawer to said supporting framework.

4. The system of claim 1 wherein said system further comprises a supporting framework and said drawer mounting means comprises linear bearings joining said drawer to said supporting framework.

5. The system of claim 1 wherein said angular displacement means comprises a series of linkages between said carousel and said drawer.

6. The system of claim 1 wherein said drawer mounting means comprises means for mounting the drawer for reciprocating linear movement between closed and open positions and said system further comprises bias means for biasing said drawer to said closed position.

7. The system of claim 1 wherein said drawer mounting means comprises means for mounting the drawer for reciprocating linear movement with said carousel passing back and forth through said degaussing gap and said angular displacement means cooperates with said rotatable mounting means and said locking means to angularly displace said carousel approximately 90 degrees with respect to said drawer upon passage of said carousel through said degaussing gap and prior to a return passage of said carousel through said degaussing gap.

8. The system of claim 1 wherein said carousel holds said magnetic storage media in a fixed rotational position.

9. A magnetic bulk degaussing system for erasing magnetic storage media, comprising:
- at least one permanent magnet projecting a magnetic field into a degaussing gap;
- a drawer operatively mounted on linear guides providing approximately linear movement of the drawer through the degaussing gap;
- a carousel rotatably mounted to the drawer, the carousel including a cavity for holding the magnetic storage media and at least one carousel notch;
- a lock arm selectively engaging at least one carousel notch during the linear movement of the drawer through the degaussing gap; and
- angular displacement means for angularly displacing the carousel through a predetermined angle with respect to the drawer after passage of the carousel through the degaussing gap.

10. The system of claim 9 wherein said angular displacement means comprises a series of linkages between said carousel and said drawer.

11. The system of claim 10 wherein the series of linkages further comprises a four bar linkage transferring power from the closing of the drawer to rotational movement of the carousel.

12. The system of claim 10 wherein the series of linkages further comprises at least one pulley operatively connected to the carousel.

13. The system of claim 9 further comprising a ratchet and pawl mechanism operatively connected to the drawer for ensuring complete closure of the drawer.

14. The system of claim 9 further comprising a cam disposed relative to the lock arm to operatively engage the lock arm to release the lock arm when the drawer reaches a closed position.

15. A method of erasing magnetic storage media comprising:
- providing at least one permanent magnet assemblage generating a magnetic field in a degaussing gap;
- placing the magnetic storage media into a cavity;
- moving the cavity through the degaussing gap while the cavity is locked to substantially prevent rotation;
- automatically rotating the cavity after moving through the degaussing gap; and
- moving the cavity through the degaussing gap after automatically rotating the cavity.

16. The method of claim 15 wherein the step of providing at least one permanent magnet assemblage generating a magnetic field in a degaussing gap further comprises providing at least two permanent magnet assemblages disposed in a spaced relationship defining the degaussing gap.

17. The method of claim 15 wherein the step of automatically rotating the cavity after moving through the degaussing gap is performed by a series of mechanical linkages.

18. The method of claim 15 wherein the step of automatically rotating the cavity after moving through the degaussing gap further comprises automatically rotating the cavity approximately 90 degrees after moving through the degaussing gap.

* * * * *